United States Patent
Shen et al.

(10) Patent No.: US 7,158,725 B2
(45) Date of Patent: Jan. 2, 2007

(54) SATURABLE LIGHT ABSORBER STRUCTURE AND A DEVICE INCORPORATING THE STRUCTURE FOR REGENERATING A WAVELENGTH DIVISION MULTIPLEXED SIGNAL

(75) Inventors: Alexandre Shen, Paris (FR); Denis Leclerc, Igny (FR)

(73) Assignee: Avanex Corporation, Fremont, CA (US)

( * ) Notice: Subject to any disclaimer, the term of this patent is extended or adjusted under 35 U.S.C. 154(b) by 1056 days.

(21) Appl. No.: 10/207,887

(22) Filed: Jul. 31, 2002

(65) Prior Publication Data
US 2003/0043484 A1 Mar. 6, 2003

(30) Foreign Application Priority Data
Aug. 30, 2001 (FR) ................................. 01 11258

(51) Int. Cl.
*H04B 10/16* (2006.01)
*H04J 14/02* (2006.01)
(52) U.S. Cl. .................. 398/97; 398/180; 359/885; 359/891; 385/24
(58) Field of Classification Search .......... 398/97, 398/180, 212; 359/885, 891; 385/24, 140; 372/11
See application file for complete search history.

(56) References Cited

U.S. PATENT DOCUMENTS
4,773,063 A 9/1988 Hunsperger et al.
2003/0184837 A1* 10/2003 Marceaux et al. .......... 359/238

FOREIGN PATENT DOCUMENTS
EP 0 994 584 A1 4/2000
FR 2 784 202 A1 4/2000
GB 2 224 612 A 5/1990

OTHER PUBLICATIONS
Patent Abstracts of Japan, vol. 014, No. 230 (p. 1048), May 16, 1990 & JP 02 056508 A (Canon Inc.) Feb. 26, 1990.

* cited by examiner

*Primary Examiner*—Leslie Pascal
(74) *Attorney, Agent, or Firm*—Patterson & Sheridan, LLP

(57) ABSTRACT

The invention relates to a saturable light absorber adapted to receive different focused spectral components, wherein the structure of said saturable light absorber comprises microcavities integrated into a substrate and each associated with a respective one of said spectral components, each microcavity comprising a saturable absorber layer delimited by a top reflector and a bottom reflector and being disposed and having dimensions such that it receives only the focused spectral component associated with it.

7 Claims, 2 Drawing Sheets

SATURABLE LIGHT ABSORBER STRUCTURE AND A DEVICE INCORPORATING THE STRUCTURE FOR REGENERATING A WAVELENGTH DIVISION MULTIPLEXED SIGNAL

The present invention relates to a particular saturable light absorber structure and its application to regenerating a wavelength division multiplexed (WDM) signal.

The invention finds a particularly advantageous application in systems for transmitting binary data at high bit rates via optical fibers.

BACKGROUND OF THE INVENTION

An optical signal propagating in optical fibers, in communication nodes or in other optical telecommunication devices in which spontaneous noise is present, inevitably suffers optical losses and is modified. The signal must be regenerated to compensate the noise accumulated during propagation of the signal and distortion and time shifting of the signal.

To be more specific, the invention proposes to use an optical regenerator to regenerate a multiplexed signal on all the WDM channels in parallel.

The objective that the invention seeks to achieve is therefore to provide a regenerator which has only one optical input and only one optical output. A WDM signal is fed into the single input and all of the regenerated WDM channels are recovered at the single output. Regenerating the WDM channels implies cleansing them of noise, which is in fact to a considerable degree tied to the propagation of light over long distances. In the case of WDM optical signals, the power of the signal on each channel is modulated.

The signal on a channel with a given wavelength therefore comprises pulses representing high logic levels ("1") and low logic levels ("0").

Accordingly, once noise at the "0" levels or noise between the "1" levels has been eliminated, an increase in the propagation distance can be expected, because the noise has been removed, and signal shaping and synchronization are virtually automatic.

A regenerator of the kind referred to above is disclosed in French Patent Application No. 98/12430 filed Oct. 5, 1998, referred to hereinafter as document D1, whose title in translation is "A device including a saturable absorber for regenerating a WDM signal".

In the above patent document, the WDM optical signal to be regenerated comes from an optical fiber and is intended to be injected back into the same optical fiber or into another fiber. The device described includes a dispersive medium, which receives the WDM signal and emits a corresponding dispersed wave into a free space, and a saturable absorber, which receives the dispersed wave and transmits a corresponding regenerated wave.

A saturable light absorber is an optical device consisting in particular of a material which absorbs a low-power optical signal but is transparent to signals of high light power. Thus the material of a saturable absorber is increasingly transparent to a light beam as the power of the beam increases.

As already pointed out, in the case of WDM optical signals, the power of the signal on each channel is modulated. When a saturable absorber receives a high power optical pulse it becomes transparent and allows the pulse to pass through it. On the other hand, the saturable absorber becomes absorbent for lower power noise between the pulses, and attenuates the noise.

Thus, according to the teaching of the prior art, the wave from an optical fiber is focused onto a saturable absorber strip at points that differ according to the wavelengths of the WDM channels because of the dispersive medium of the device.

FIG. 1 shows in section a prior art saturable absorber strip that receives a dispersed wave and transmits a corresponding regenerated wave. The active layer 2 of the absorber 1 is conventionally made from a ternary material, for example InGaAs or AlGaAs, and includes multiple quantum wells. It could equally well be made of a quaternary material. Two reflectors 3 and 4 are placed parallel to and on opposite sides of the active layer 2 to cause multiple reflections of the light wave passing through the active layer 2.

Because of the multiple reflections, the light wave passes through and is absorbed by the active layer 2 several times, which has the advantage of reducing the required thickness of the active layer. The bottom reflector 4 is deposited on a layer 5 forming the substrate, for example an InP layer.

The combination of the active layer 2, the top reflector 3, and the bottom reflector 4 has a uniform thickness $e$ over the whole of the length of the saturable absorber strip 1.

Using the above kind of saturable absorber strip to regenerate a WDM signal is known in the art. FIG. 2 shows a prior art WDM signal regenerator described in document D1 which uses the strip shown in FIG. 1.

The optical signal from the fiber A is projected by a lens B1 onto a grating B2.

The grating B2 separates the optical signal into a plurality of light beams having different wavelengths and deflects each light beam at an angle that depends on the dispersion coefficient of the grating and on the wavelength of said beam. A second lens B3, situated at the exit from the grating B2, then focuses each beam deflected by the grating onto a spot on the saturable absorber C.

The spot associated with each light beam is in fact focused on the absorber C at a location x which depends on the dispersion coefficient of the grating B2 and on the wavelength of the deflected beam.

Thus each wavelength of the WDM optical signal corresponds to a respective point where its spot is focused on the saturable absorber C.

After regeneration in the saturable absorber, each of the beams must be returned the way it came in order to be redirected towards the input fiber A, after recombination of all the regenerated beams by the grating B2.

To be able to reflect the regenerated signal, the saturable absorber strip C has a reflective coating or a Bragg reflector on its second face C1, which is generally perpendicular to the direction of propagation of the wave that it receives.

A spatial separator, for example a circulator F, must be provided at the other end of the fiber A. The circulator F separates the optical signal to be regenerated, which travels in one direction, from the regenerated optical signal, which travels in the opposite direction.

However, the prior art saturable absorber structure used in the FIG. 2 optical regenerator does not provide the ideal processing to regenerate a WDM signal.

Thus problems are encountered with the prior art saturable absorber structure as described, and are unacceptable if correct regeneration of a WDM signal is the aim.

In particular, a first drawback of the prior art regenerator is the difficulty of recovering the regenerated signal.

Each of the beams corresponding to a particular wavelength channel of the WDM signal is focused onto the saturable absorber with a different angle of incidence relative to the optical axis of the lens B3.

The front mirror of the saturable absorber is typically adjusted to reflect beams impinging on its surface perpendicularly. Because of the different angles of incidence, reflection at the front mirror of the saturable absorber of each of the beams corresponding to respective wavelength channels of the WDM signal cannot be controlled accurately, which makes it impossible to recover the complete regenerated WDM signal in the fiber A.

Also, not all wavelengths can resonate at the same time. For the wave associated with a light beam impinging on the saturable absorber strip to be regenerated effectively, the amplitude peak of the wave, i.e. the anti-node of the wave, must be at the level of the active layer of the saturable absorber, to maximize interaction between the wave and the active layer of the absorber.

The condition for resonance is given by the following equation, which establishes the correspondence between the incident wavelength and the thickness of the saturable absorber cavity:

$$\lambda = n_{eff} \cdot e / k$$

where:

$\lambda$ is the wavelength of the wave crossing the saturable absorber cavity, $e$ is the thickness of the saturable absorber cavity, $n_{eff}$ is the effective index of the medium, and $k$ is an integer and indicates the order of resonance.

As the prior art strip has constant thickness $e$ throughout its length, the adjustment that satisfies the condition of resonance is obtained for a very specific wavelength satisfying the above condition. In the case of a WDM signal comprising 25 different wavelengths $\lambda 1$ to $\lambda 25$, for example, the condition for resonance cannot be satisfied at all of the wavelengths. Thus, if the saturable absorber strip is adjusted for the value $\lambda 1$, on moving away from this adjustment, the thickness $e$ of the strip being constant, the condition for resonance will no longer be satisfied at $\lambda 25$. In other words, it is not permissible to obtain the wave associated with the resonant wavelength $\lambda i$ in the active layer regardless of the value of $i$, from 1 to 25 in this example. The regeneration of the WDM signal is therefore less than the optimum, because the condition for resonance is not satisfied at all wavelengths. In fact, some channels are given preference over others.

What is more, considering a reference position corresponding to that of the light beam which impinges on the front face of the saturable absorber strip perpendicularly, it can be shown that as the distance from this reference position increases, so does the angle of incidence of each light beam associated with a WDM channel of wavelength $\lambda i$. Physically, the lens B3 focuses each light beam on a spot which occupies an area of the saturable absorber.

After multiple reflections of the wave within the active layer of the absorber, as described with reference to FIG. 1, this area is offset for beams with a large angle of incidence.

In this case, the effective area which corresponds to the overlap within the active layer between the area occupied by the spot before regeneration and the area occupied by the spot after regeneration is therefore considerably reduced. There is therefore a problem of overlapping of the area occupied by the spot when the angle of incidence is high.

Finally, a last prior art problem concerns crosstalk. To each wavelength constituting the WDM signal there corresponds a point of focusing of the associated spot on the saturable absorber, and these focusing points are very close together. Crosstalk then arises as charge carriers diffuse in the material forming the active absorber layer of the strip when the latter is illuminated at a focusing point.

If the focusing points are too close together, the diffusion of these charge carriers at one focusing point interferes with the portion of the absorber material adjoining it and the processing (noise absorption) of the corresponding WDM channel will therefore be defective.

OBJECTS AND SUMMARY OF THE INVENTION

An object of the present invention is to solve the problems of the prior art by proposing a saturable light absorber which satisfies the objectives of optimum regeneration of a WDM signal including a large number of spectral components when implemented in the above kind of application.

To this end, the saturable absorber strip has a structure which includes integral microcavities. Each integral microcavity of the saturable light absorber is advantageously designed to be associated with and to process only one of the focused spectral components of a WDM optical signal. Also, the thickness of each of the microcavities is matched to the wavelength of the associated focused spectral component to make it resonate within the active absorber layer of the microcavity.

The present invention provides a saturable light absorber adapted to receive different focused spectral components, wherein the structure of said saturable light absorber comprises microcavities integrated into a substrate and each associated with a respective one of said spectral components, each microcavity comprising a saturable absorber layer delimited by a top reflector and a bottom reflector and being disposed and having dimensions such that it receives only the focused spectral component associated with it.

The invention also provides an optical regenerator comprising a wavelength division demultiplexer for receiving a WDM signal and for focusing the spectral components of said WDM signal at respective spatially separated points, said optical regenerator further comprising a saturable light absorber structure adapted to receive said focused spectral components, wherein said saturable light absorber structure comprises integrated microcavities in a substrate each associated with a respective spectral component, each microcavity comprising a saturable absorber layer delimited by a top reflector and a bottom reflector and being disposed and having dimensions such that it receives only the focused spectral component that is associated with it.

BRIEF DESCRIPTION OF THE DRAWINGS

Other features and advantages of the present invention become more clearly apparent on reading the description given by way of illustrative and non-limiting example with reference to the accompanying drawings, in which.

MORE DETAILED DESCRIPTION

Figure 3:
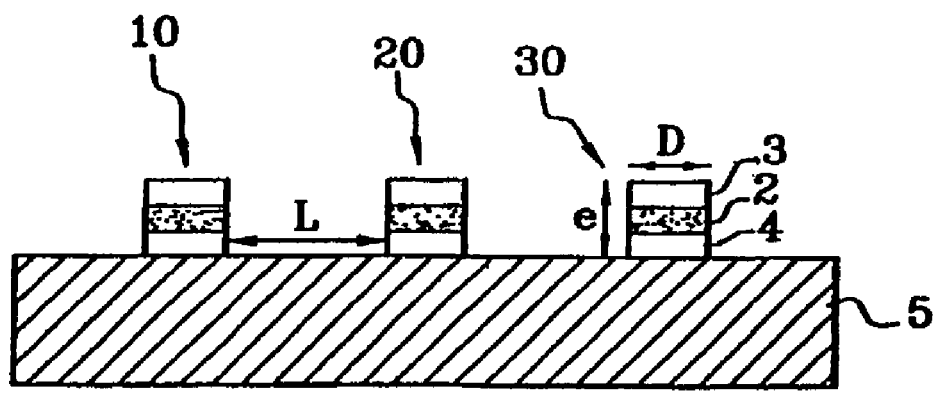
FIG. 3 is a diagram of a first embodiment of a saturable light absorber according to the invention.

Thus FIG. 3 is a diagram of a first embodiment of a saturable light absorber according to the invention.

Thus the saturable light absorber strip according to the invention includes a plurality of microcavities deposited on a substrate 5, for example an InP substrate, three microcavities 10, 20 and 30 being shown by way of example. In this configuration, the charge carriers can no longer diffuse and thereby interfere with the process in an adjoining microcavity.

Each of the microcavities 10, 20 and 30 has a layer of saturable absorber elements 2 which is delimited by a top reflector 3 and a bottom reflector 4.

The absorber layer 2 can be a doped saturable absorber or an irradiated saturable absorber, is preferably made from a ternary material, and comprises multiple quantum wells. The top reflector 3 and the bottom reflector 4 are advantageously made of metal (for example gold or a TiAu or TiPtAu alloy) or a multilayered dielectric or semiconductor (Bragg mirrors). Thus a light spot injected into one of the microcavities of the saturable absorber is reflected several times between the two reflectors before it emerges, and the light wave therefore passes through the active layer 2 several times.

Each of the microcavities of the saturable light absorber is designed to be associated with a respective one (and only one) of the spectral components focused onto the saturable absorber and which form the WDM signal to be processed by the saturable absorber.

Accordingly, the saturable light absorber structure according to the invention comprises the same number of microcavities as there are wavelength channels constituting the WDM signal to be regenerated by the saturable absorber strip. The distance L between the microcavities must be determined as a function of the multiplexer used to form the WDM signal, i.e. as a function of the spectral interval between the wavelength channels constituting the multiplexed signal.

Figure 1:
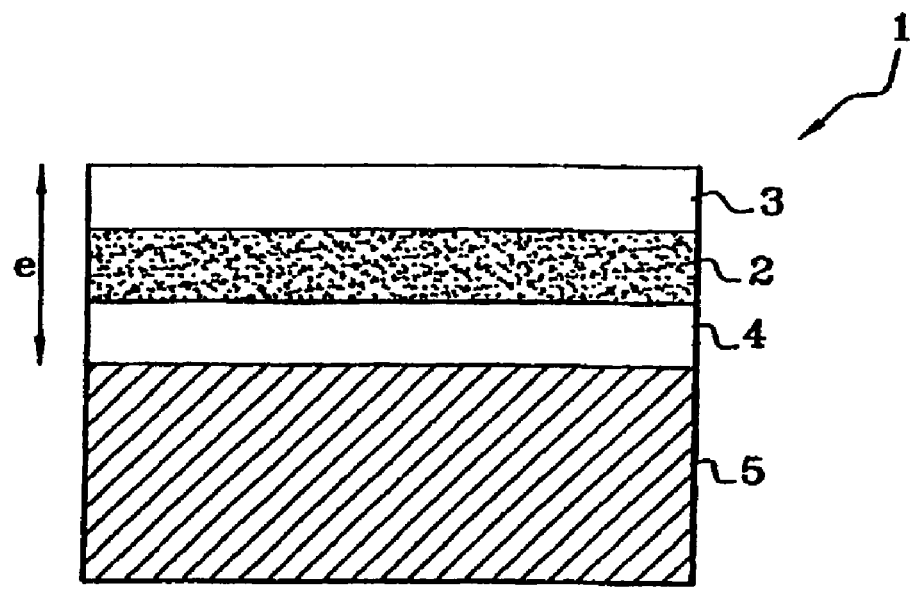
FIG. 1, already described, is a sectional view of a prior art saturable light absorber strip.
Figure 2:
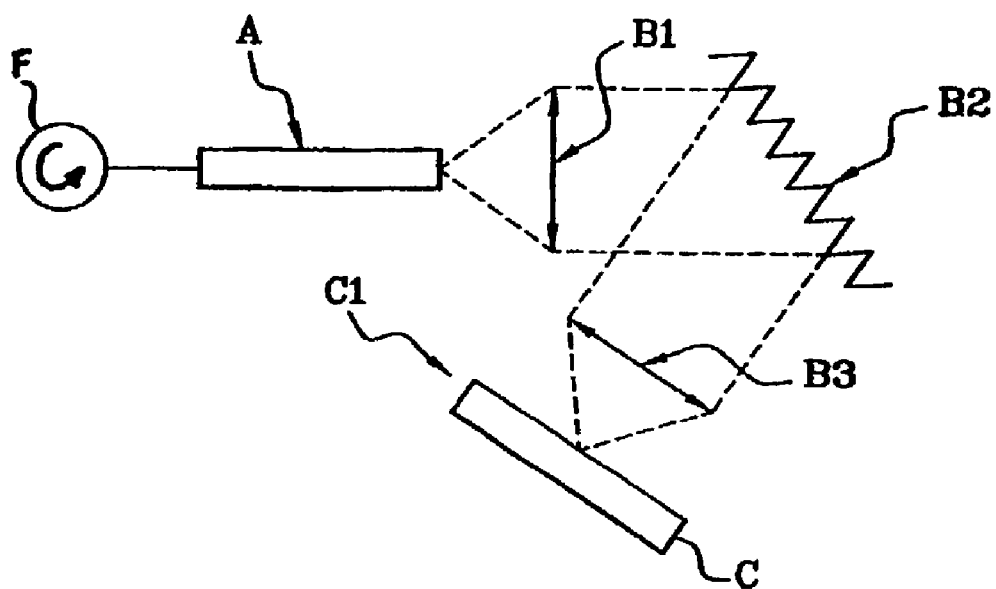
FIG. 2, already described, shows an optical regenerator using the above prior art saturable light absorber strip.

In an application to regenerating a WDM signal, as shown in FIG. 2, a wavelength division demultiplexer is used to receive the WDM signal and to focus the spectral components of the WDM signal at respective separate points on the saturable absorber strip, the distance between the focusing points conforming to the spectral interval between the spectral components of the WDM signal.

It is therefore important to match the distance L between the microcavities to the multiplexer used to form the WDM signal in order to be certain that all the spectral components of the multiplexed signal are associated with a microcavity of the saturable absorber to regenerate them.

The particular structure of the saturable light absorber according to the present invention therefore entails disposing the microcavities so that they receive the respective spectral components with which they are associated.

Moreover, each of the microcavities 10, 20, 30 has a diameter D and a thickness $\underline{e}$ such that it receives and processes efficiently only the spectral component with which it is associated.

Because of the particular microcavity structure of the saturable absorber, the usable surface area is small. Accordingly, because of the diffraction of the light, the light acceptance cone of each microcavity is enlarged.

The admission angle θ, i.e. the maximum value of the angle to the surface of a microcavity of an incident beam associated with a spectral component of the WDM signal for said beam to be processed optimally by the absorber layer of the microcavity, is inversely proportional to the diameter D of the microcavity. The value of the admission angle θ can be controlled by varying the diameter D of the microcavity, which solves the problem referred to above of overlapping of the spot on the surface of the saturable absorber.

This is because, the light acceptance cone being enlarged in this way by varying the diameter D, even if the angle of incidence of a light beam corresponding to a channel of given wavelength is high, the processing of the wave in the microcavity is optimized provided that the angle of incidence is less than the value of the admission angle θ. There is then no "slipping" of the wave during multiple reflections within the microcavity.

Accordingly, the diameter D of each of the microcavities 10, 20 and 30 is matched to the associated spectral component to match the light admission angle θ at the surface of the microcavity in question to the angle of the incident light beam corresponding to the focused spectral component associated with said microcavity.

This particular microcavity structure of the saturable absorber therefore significantly increases the maximum value of the angle of incidence formed by a light beam corresponding to a WDM channel of given wavelength at the surface of the saturable absorber.

The effective thickness of the set of layers 2, 3 and 4 of each of the microcavities 10, 20, 30 of the saturable light absorber is matched only to the respective focused spectral component associated with it, so that constructive interference occurs between the associated focused spectral component and the layer of saturable absorber elements 2 of each microcavity (this difference in thickness is not shown in the figure). This maximizes the absorption of the associated focused spectral component in the saturable absorber layer 2 of the microcavity.

As previously stated, the condition of resonance for a given wavelength is closely related to the thickness of the saturable absorber cavity by the following equation:

$$\lambda = n_{\mathit{eff}} \cdot e / k.$$

Accordingly, the particular microcavity structure of the saturable light absorber according to the present invention advantageously has a different thickness $\underline{e}$ for each microcavity, specifically matched to the focused spectral component associated with it, in order to satisfy the condition of resonance.

Each microcavity therefore has dimensions determined for optimum processing of only the focused spectral component associated with it.

The diameter and thickness of each microcavity 10, 20, 30 are therefore determined, on the one hand, for optimum processing even of spectral components whose angle of incidence on the microcavity is high and, on the other hand, so that the condition of resonance is satisfied regardless of the incident wavelength.

The particular structure of the saturable light absorber according to the invention with a plurality of microcavities having a varying thickness $\underline{e}$ is obtained by using the selective area growth (SAG) technique in the metal organic chemical vapor deposition (MOCVD) epitaxial growth process, which is used to fabricate integrated optoelectronic components comprising waveguides having different structures and in particular different thicknesses.

However, the SAG technique has not yet been used in the above kind of application in accordance with the present invention. Applying the SAG technique to the saturable absorber strip provides a thickness gradient section in the saturable absorber layer 2 delimited by the top reflector 3 and the bottom reflector 4.

Thus selective epitaxial growth forms a gradient section of the saturable absorber substrate. To this end trapezoidal dielectric masks on which the III and V materials grown epitaxially are not deposited, for example silica ($SiO_2$) or silicon nitride ($Si_3N_4$) masks, are deposited in a single step.

The rate of growth is increased between two adjacent masks in inverse proportion to the distance between the patterns. The thickness is therefore increased between the masks.

Accordingly, the masks are placed side by side so that the distance between them is relatively small in the vicinity of a first area corresponding to the required section of maximum thickness and increases slowly in the direction away from this first area towards a second area corresponding to the required thinner section. This particular trapezoidal shape of the masks and their disposition therefore forms thickness gradient sections between the first and second areas, respectively corresponding to the thick section and to the thinner section of the layer that has been grown.

Thus using the SAG technique controls the thickness of epitaxial growth in the direction perpendicular to the bases of the trapezium formed by the channel between the two masks.

For more details of this selective growth technique, see patent application FR 2 768 232 in the name of Alcatel Alsthom Recherche, especially pages 7 to 9.

The microcavities are then etched in the conventional way. The diameter of the microcavities can be controlled during this step by using appropriate masks.

The thickness $e$ of the microcavities can therefore be varied along the axis $x$. Each microcavity of the saturable absorber then resonates at the wavelength associated with it.

Figure 4:
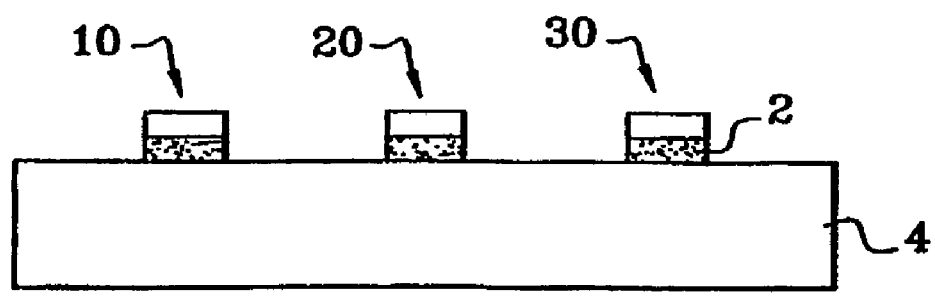
FIG. 4 is a diagram of a second embodiment of a saturable light absorber according to the invention.

In a particular embodiment of the invention shown in FIG. 4, the saturable light absorber has a different configuration in which the bottom reflector is integrated into the microcavity structure when growing the layers. The bottom reflector 4 is then a Bragg mirror and is grown epitaxially as far as the top of the InP substrate, for example.

With this configuration, a supplementary blocking layer must therefore be provided under the active absorber layer 2 to prevent etching beyond the active layer 2. The blocking layer is eliminated subsequently. The advantage of this configuration over that described with reference to FIG. 3 is that it is easier to evacuate heat.

The light absorber comprising a plurality of microcavities in accordance with the present invention imposes the use of a fixed comb of wavelengths because the dimensions of its structure must be determined beforehand as a function of specific characteristics of the WDM input signal. However, this must not be seen as a disadvantage in a telecommunication environment subject to more and more standardization.

Also, the performance of the microcavities of this kind of saturable light absorber strip according to the invention is considerably enhanced compared to the performance obtained with a prior art strip.

For example, this improvement in the performance of the microcavity is particularly noticeable in an application of the saturable light absorber according to the invention to an optical regenerator already described with reference to FIG. 2 and including a wavelength division demultiplexer receiving a WDM signal comprising at least 25 wavelengths, for example, and focusing the spectral components of the WDM signal at respective spatially separated points on the saturable light absorber strip, to be more specific at points corresponding to the locations of the microcavities on the strip. The demultiplexer advantageously comprises a pair of lenses B1, B3 disposed on respective opposite sides of a grating B2.

The particular structure of the saturable light absorber according to the invention then provides optimum processing for eliminating noise from each spectral component of the WDM signal.

The use of saturable light absorbers in accordance with the present invention is naturally not limited to the optical regenerator in accordance with the invention, and they can be used in other types of devices for regenerating signals (for example optical gates controlled by an optical signal) or in electrically-controlled absorber modulators (by depositing metal contacts on respective opposite sides of the active layer).

The invention claimed is:

1. A saturable light absorber adapted to receive different focused spectral components, wherein the structure of said saturable light absorber comprises microcavities integrated into a substrate and each associated with a respective one of said spectral components, each microcavity comprising a saturable absorber layer delimited by a top reflector and a bottom reflector and being disposed and having dimensions such that it receives only the focused spectral component associated with it.

2. A saturable light absorber according to claim 1, wherein the effective thickness of each microcavity is matched to the spectral component associated with it to maximize the absorption of the associated focused spectral component in the saturable absorber layer of said microcavity.

3. A saturable light absorber according to claim 1, wherein the diameter of each microcavity is matched to the spectral component associated with it in order to match the admission angle of light at the surface of said microcavity to the angle to said surface of the incident light beam corresponding to the focused spectral component associated with said microcavity.

4. A saturable light absorber according to claim 1, wherein the top reflector and the bottom reflector are made of metal or a multilayered dielectric or semiconductor.

5. A saturable light absorber according to claim 1, wherein the saturable absorber layer includes a ternary material active layer with multiple quantum wells.

6. An optical regenerator comprising a wavelength division demultiplexer for receiving a WDM signal and for focusing the spectral components of said WDM signal at respective spatially separated points, said optical regenerator further comprising a saturable light absorber structure adapted to receive said focused spectral components, wherein said saturable light absorber structure comprises integrated microcavities in a substrate each associated with a respective spectral component, each microcavity comprising a saturable absorber layer delimited by a top reflector and a bottom reflector and being disposed and having dimensions such that it receives only the focused spectral component that is associated with it.

7. An optical regenerator according to claim 6, wherein the demultiplexer comprises a pair of lenses, one on each side of a grating.

* * * * *